United States Patent [19]

Wilson et al.

[11] 4,163,726
[45] Aug. 7, 1979

[54] VALVE ASSEMBLY FOR CYCLONES OR OTHER ABRASIVE APPLICATIONS

[76] Inventors: Peter C. Wilson, 2415-D.S. Xanadu Way, Denver, Colo. 80232; Robert P. Hughart, 9451 E. Grand Ave., Englewood, Colo. 80110

[21] Appl. No.: 891,544

[22] Filed: Mar. 30, 1978

Related U.S. Application Data

[63] Continuation-in-part of Ser. No. 792,126, Apr. 29, 1977, abandoned.

[51] Int. Cl.² .............................................. B01D 21/26
[52] U.S. Cl. ................................. 210/512 R; 55/432; 251/212
[58] Field of Search ................... 210/512; 251/212, 10; 55/432; 266/38; 137/545

[56] References Cited

U.S. PATENT DOCUMENTS

| | | | |
|---|---|---|---|
| 497,903 | 5/1893 | Woodward | 251/212 |
| 2,648,433 | 8/1953 | Wright et al. | 55/432 |
| 2,911,997 | 11/1959 | Schramm et al. | 251/212 |
| 3,618,925 | 11/1971 | Girolami | 266/38 |

*Primary Examiner*—Frank A. Spear
*Attorney, Agent, or Firm*—Burton & Dorr

[57] ABSTRACT

A valve assembly for controlling the flow of material in a duct such as a pipeline, outlet of a cyclone, nozzle and the like. The assembly is particularly suitable for controlling spiralling flows and includes a plurality of elongated valve members pivotally mounted at a first end to a support. Each valve member has at least two elongated and substantially planar sides extending from the first end to a second end. The two planar sides are joined to form a leading edge. The valve members are supported in an overlapping relationship and a mechanism closes the valve assembly by moving the second ends of the valve members toward each other. As the valve assembly closes, the leading edge of each valve member pivots about an axis and moves in a path along a plane extending radially from the axis of the valve assembly. The valve assembly is biased in the open position by the support means, and, as the valve assembly closes, the leading edge of each valve member in cooperation with the outwardly biasing force from the support means and reacting to the internal pressure drop across the valve forceably scrapes a side of an adjacent valve member in order to form a seal therewith. The leading edges of the valve members converge toward a common point as the valve assembly closes.

47 Claims, 24 Drawing Figures

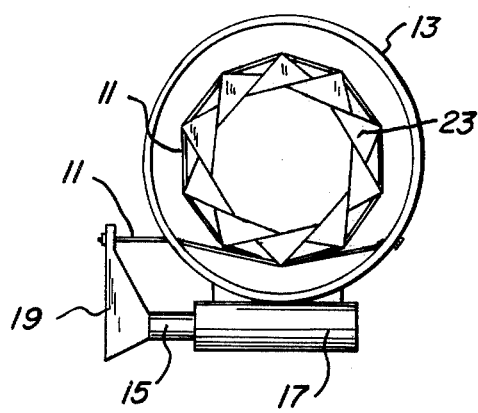
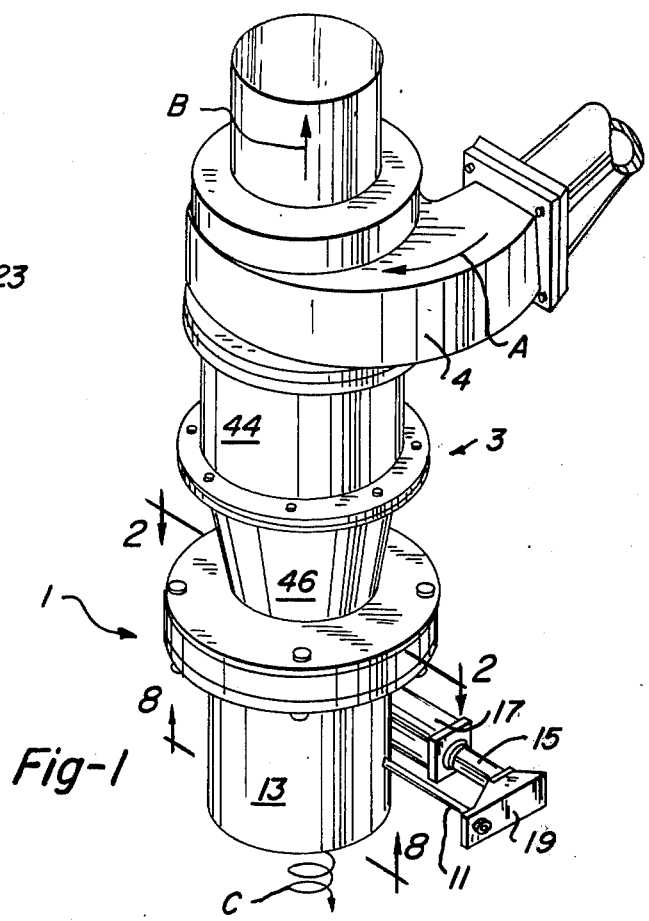
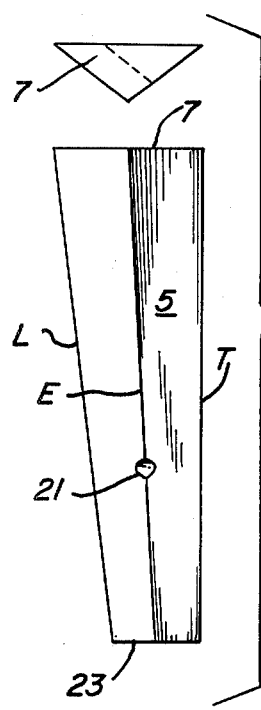
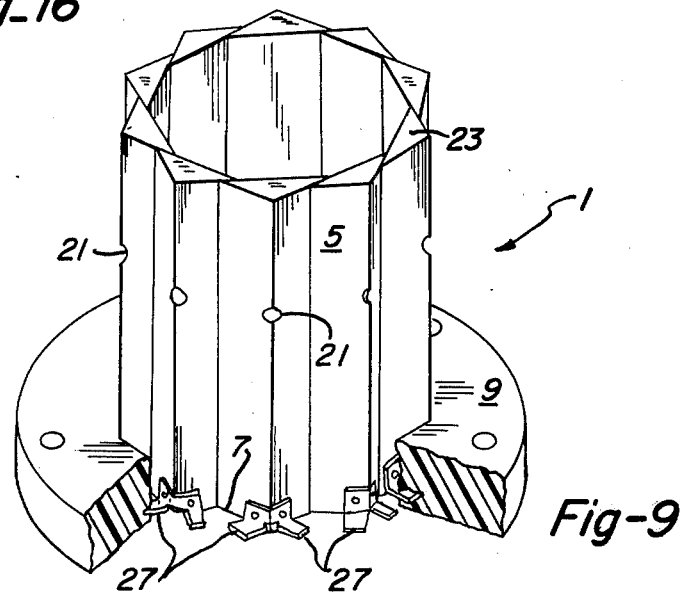
Fig-8
Fig-1
Fig-16
Fig-9

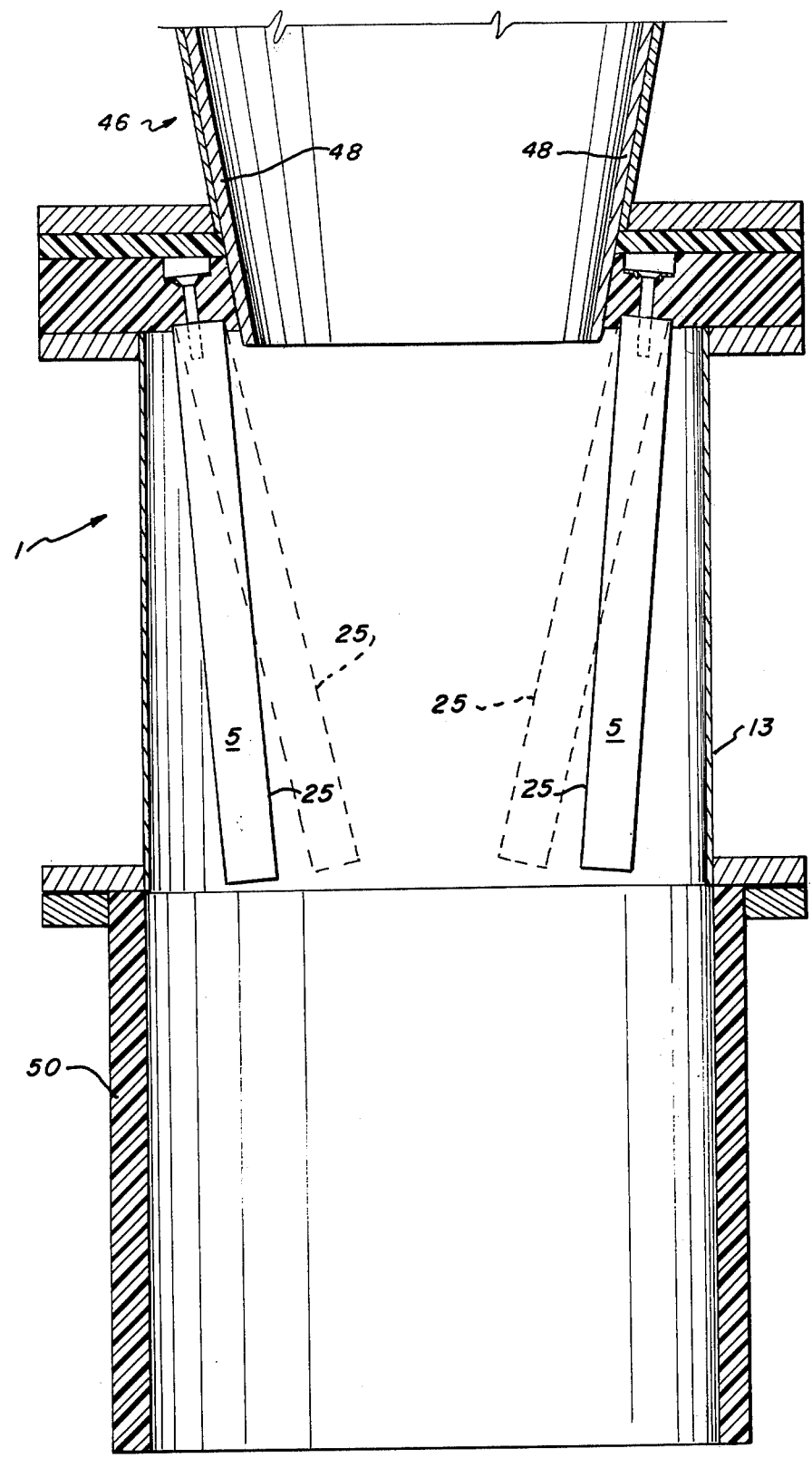
Fig_20

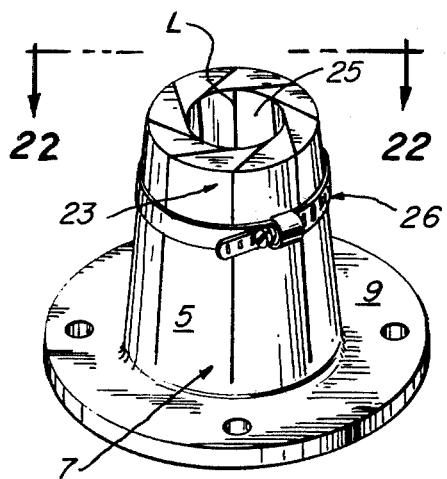
Fig_21
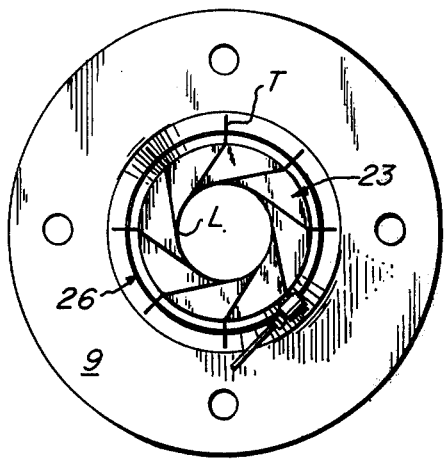
Fig_22
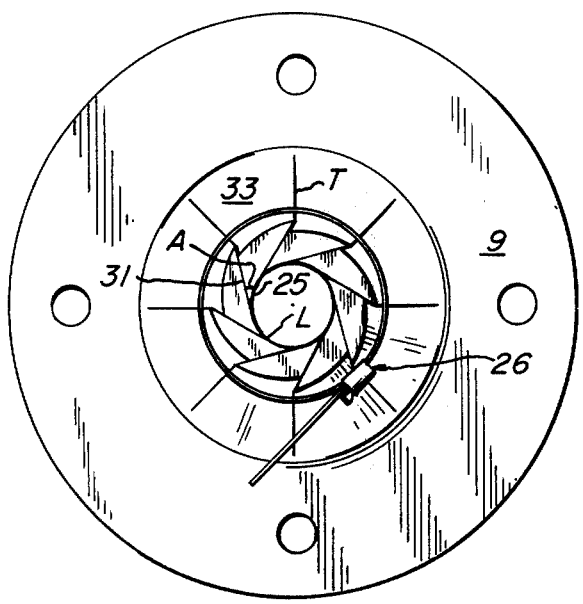
Fig_23
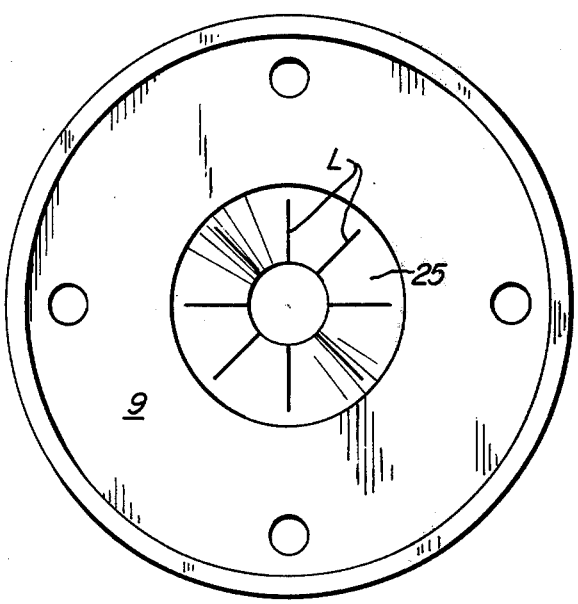
Fig_24

4,163,726

VALVE ASSEMBLY FOR CYCLONES OR OTHER ABRASIVE APPLICATIONS

RELATED APPLICATIONS

This application is a continuation-in-part application of U.S. Patent Application Ser. No. 792,126 filed on Apr. 29, 1977, now abandoned.

BACKGROUND OF THE INVENTION

1. Field of the Invention Application

This invention relates to the field of valve assemblies for controlling the flow of material through a duct such as a pipeline, outlet of a cyclone, nozzle, and the like. The invention is particularly suitable for controlling spiralling flows of abrasive material or slurries in a pipeline or at the outlet of a cyclone.

2. Background of the Prior Art

Past valve assemblies for controlling the size of an opening in a duct such as a pipeline, outlet for a cyclone, nozzle, and the like have included slide valves such as U.S. Pat. Nos. 2,964,304 to Rice, issued Dec. 13, 1960, and 3,545,735 to Wolf, issued Dec. 8, 1970; rotary valves such as U.S. Pat. No. 3,179,471 to Savage, issued Apr. 20, 1965; weight actuated dump valves such as U.S. Pat. No. 2,792,910 to Redniss, issued May 21, 1957; iris valves with valve elements movable in a plane perpendicular to the flow such as U.S. Pat. Nos. 3,159,179 to DeLain, issued Dec. 1, 1964, 2,735,664 to Gamble, issued Feb. 21, 1956, and 2,649,272 to Barbato, issued Aug. 18, 1953; and valve assemblies in which the movable valve elements extend for a distance in the direction of the flow such as U.S. Pat. Nos. 3,183,776 to Wallis, issued May 18, 1865, 2,094,707 to Jones, issued Oct. 15, 1937, 2,770,944 to Jordan, issued Nov. 20, 1956, 3,136,525 to Creasser, issued June 9, 1964, 3,805,609 to Sato, issued Apr. 23, 1974, 2,726,509 to Gist, issued Dec. 13, 1955 and 2,926,489 to Halford, issued Mar. 1, 1960. Other assemblies having movable elements that extend in the direction of the flow and slide relative to each other include U.S. Pat. Nos. 497,903 to Woodward issued May 23, 1893, 3,226,768 to Zelewsky issued Jan. 4, 1966, and 3,618,925 to Girolami issued Nov. 9, 1971.

Valve designs that move the valve elements in a plane perpendicular to the flow such as U.S. Pat. Nos. 2,735,664 to Gamble, 2,649,272 to Barbato and 3,159,179 to DeLain create excessive turbulence in the flow. Further, if the material being conveyed through the ducts exerts a relatively high force on the valve elements or if the material is abrasive as in a silica and slurry, these valve elements tend to become misaligned or worn away and the control and sealing properties of the valves are greatly diminished. Valve designs with valve elements that seal along line contacts such as U.S. Pat. Nos. 3,136,525 to Creasser, 2,770,944 to Jordan and 2,094,707 to Jones have these same problems if the material being conveyed exerts high pressure on the valve elements or if the material is abrasive. Valve designs with valve elements that extend in the direction of the flow and overlap tend to operate better. In these designs, the sealing contact between each valve element extends over an area rather than a mere line contact. U.S. Pat. Nos. 497,903 to Woodward and 3,618,925 to Girolami illustrate such assemblies in which a plurality of overlapping valve elements slide relative to each other along their entire length. In these assemblies, a portion of each valve element is slidably mounted in a support. U.S. Pat. No. 3,226,768 to Zelewsky shows an assembly in which prismatic valve elements slide over a portion of each other as each valve element is moved axially to close the assembly. U.S. Pat. Nos. 2,926,489 to Halford and 2,726,509 to Gist illustrate valves with overlapping valve elements in which both ends of every other valve element are exposed to the flow. With such designs, if the material is spiralling through the duct, it will quickly wear away one exposed end of every second valve element and greatly diminish the sealing properties of the valve.

Problems with spiralling flows of abrasive material occur repeatedly in a duct at the outlet of a cyclone that is handling slurries or particulate matter such as sand. Valve assemblies at the outlet of a cyclone not only need to be long lasting and wear resistant but also need to be good control valves. They should close uniformly around the periphery of the outlet opening of the cyclone so that the opening becomes progressively smaller and uniformly tapers to a point.

SUMMARY OF THE INVENTION

This invention involves a new and unique valve assembly for controlling the flow of material in a duct such as a pipeline, outlet to a cyclone, nozzle, and the like. The novel valve assembly is designed to resist wear from abrasive materials and slurries and to provide long lasting alignment of the valve members for superior sealing characteristics. The invention is particularly suitable for controlling spiralling flows of abrasive material or slurries in a pipeline or at the outlet of a cyclone.

In one embodiment, elongated valve members are attached at one end to a support means in such a manner as to permit pivotal movement. The valve members are supported in an overlapping relationship to encompass a flow passage space and extend in the direction of the flow in the duct. Each valve member has a second end which is downstream of the first end and is free standing. In one embodiment, the support is flexible and biases the valve members in a first overlapping position in which the valve is open and material can flow through it. If desired, the valve members and support can be of one-piece construction forming a unitary member. The valve assembly includes a closing arrangement in which the second ends of the valve members are moved toward each other to close the valve. As the valve assembly closes, the flexible support adjacent the first end portions of valve members is stressed and the force biasing the valve members toward their open position increases progressively to more tightly press the valve members together. Each valve member has at least two planar sides joined at an angle to form a leading edge. As the assembly closes, each leading edge is pivoted about an axis to converge toward a common point.

The valve members are continuously held in an overlapping relationship. In one embodiment, each valve member has four sides. In a second embodiment, each valve member has three sides with the first and second sides joined at an angle to form a leading edge, the first and third sides joined at an angle to form a trailing edge, and the second and third sides joined at an angle to form a third edge. The leading, trailing, and third edges extend the length of each valve member and can be parallel to each other or converge toward each other in the direction from the first end to the second end of each valve member or converge toward each other in the direction from the second end to the first end of each valve member. The valve members are supported in an overlapping relationship to encompass a space wherein the leading edge and second side of one valve member are pressed tightly against the first side of another valve member and the trailing edge and first side of same one valve member are pressed tightly against the second side of a third valve member. When the second ends of the valve members are moved toward each other to close the valve, the leading edge of one valve member scrapes clean the first side of another valve member enabling the second side of that one valve member to form a seal with the first side of the other valve member. Each leading edge in the preferred embodiment converges toward the axis of the valve assembly so that the valve assembly closes uniformly.

The valve members can have two or more sides and the included angle of the leading edge if preferably 360° divided by the number of valve member, or less. In a preferred embodiment, each valve member has three sides with the angle of the leading and trailing edges being equal to 360° divided by the number of valve members. In another embodiment, the second and third sides join at a 90° angle and the angle of the leading edge is 360° divided by the number of valve members. Preferably, the third edge is spaced from the first side a distance equal to at least one-eighth the distance between the leading and trailing edges and the ends of each valve member are spaced a distance at least equal to the distance between the leading and trailing edges.

If the flow in the duct is spiralling, then the valve assembly is preferably positioned so that the flow strikes the first side of a valve member and then moves toward the leading edge of the valve member. The closing arrangement is preferably a linearly operating apparatus with the valve members constructed of wear resistant material. In one embodiment, the first side of each valve member is provided with a seal member along its length to increase further the sealing properties of the valve assembly.

The invention also includes the new and novel combination of the valve assembly with a hydrocyclone. In the combination, the first side of each valve member is supported at the first end portion thereof to be substantially flush with the material outlet of the hydrocyclone. In a preferred embodiment, the hydrocyclone has a lower, conical portion tapering toward the material outlet thereof and the valve assembly forms a conical continuation of the lower portion of the hydrocyclone as the valve assembly closes. This provides for a smooth transition of the flowing material from the hydrocyclone as the valve assembly closes. This provides for a smooth transition of the flowing material from the hydrocyclone outlet through the valve assembly and better control the flow.

OBJECTS OF THE INVENTION

It is an object of this invention to provide a new and novel valve assembly and method for controlling the flow of material in a duct such as a pipeline, outlet of a cyclone, nozzle and the like.

It is also an object to provide a new and novel valve assembly and method for controlling the spiralling flow of abrasive material and slurries in a duct such as a pipeline, outlet of a cyclone, nozzle, and the like.

It is an object to provide a new and novel valve assembly that is wear resistant, long lasting, and has superior sealing characteristics.

It is an object of the present invention to provide a new and novel valve assembly that uses sliding surfaces to form seals and has a means to scrape clean the area of one surface ahead of where the two sliding surfaces will contact each other as the valve assembly is closed.

It is an object to provide a new and novel valve assembly and method that uniformly closes toward a point enclosing a cone-like space while maintaining the inlet portion of the valve assembly biased to the original full open valve diameter.

It is an object to provide a new and novel valve assembly that uses surfaces to form seals wherein the surfaces are pressed progressively harder against each other as the valve assembly is closed.

Another object is to provide a new and novel hydrocyclone with a valve for the material outlet therein, the hydrocyclone having a lower portion tapering toward the material outlet and the valve having sides supported substantially flush with the tapering portion at the outlet to form a smooth transition for the material flow.

Another object is to provide a new and novel hydrocyclone with a lower, conical portion tapering toward a material outlet, which outlet has a valve that forms a substantially conical continuation of the conical portion of the hydrocyclone as the valve closes.

It is also an object to provide a new and novel hydrocyclone with an outlet valve for controlling the flow of spiralling material exiting the hydrocyclone, the valve having valve members designed to receive the spiralling flow in a new and novel manner along one side thereof for long lasting, wear resistant operation and superior sealing characteristics.

Additional objects as well as features and advantages of this invention will become evident from the descriptions set forth hereinafter when considered in conjunction with the accompanying drawings.

BRIEF DESCRIPTION OF THE DRAWINGS

FIG. 1 is a perspective view of the valve assembly in use to control the size of the opening at the outlet of a cyclone.

FIG. 8 is a view along line 8—8 of FIG. 1 illustrating a preferred arrangement for closing the valve assembly.

FIG. 9 illustrates one means by which the valve members may be movably mounted to the support means by an elastomer that is broken away to show the flanges on the valve members.

FIG. 10 illustrates how the valve assembly uniformly closes toward a point. FIG. 10 also illustrates the preferred direction of the spiral flow of material in relation to the valve members. In this embodiment, there are ten valve members and the angles between the three sides of each valve member are 36°, 36° and 108° respectively.

FIG. 16 shows an embodiment in which the valve member is tapered.

FIG. 20 shows the valve members in a half-closed position. The first sides of the valve members are substantially flush with the tapering lower portion of the hydrocyclone and form a continuation of the conical tapering of the hydrocyclone's lower portion. This offers a smooth transition for the flowing material from the lower portion of the hydrocyclone through the valve.

FIG. 21 is a perspective view of a modified valve assembly in which the valve members and support means are made of a one-piece construction forming a unitary member.

FIG. 22 is a view along line 22—22 of the modified valve assembly of FIG. 21.

FIG. 23 is a view similar to that of FIG. 22 showing the relative position of the valve members when the valve assembly is half-closed.

FIG. 24 is a view opposite that of FIG. 23 illustrating how the leading edges of the valve members converge toward a common point as the valve assembly closes.

DETAILED DESCRIPTION OF THE PREFERRED EMBODIMENTS

Figure 2:
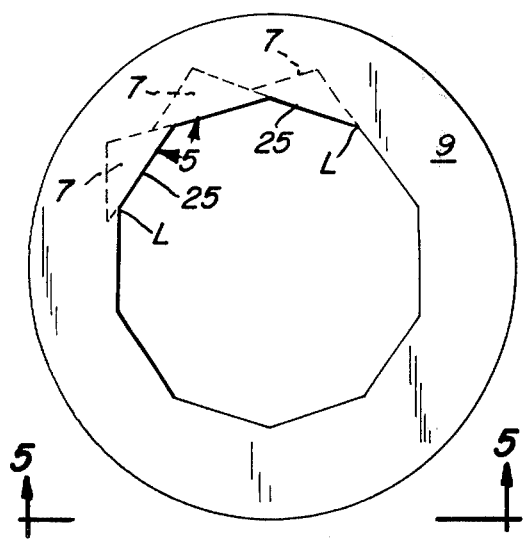
FIG. 2 is a view taken along line 2—2 of FIG. 1 showing the valve assembly in the open position.
Figure 3:
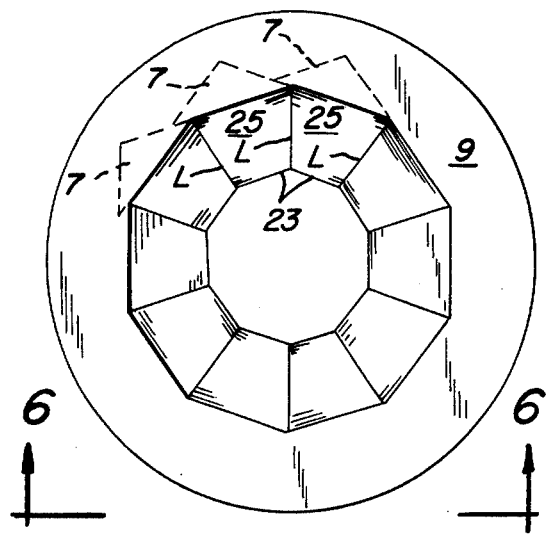
FIG. 3 is a view similar to FIG. 2 showing the valve assembly in a half-closed position.
Figure 4:
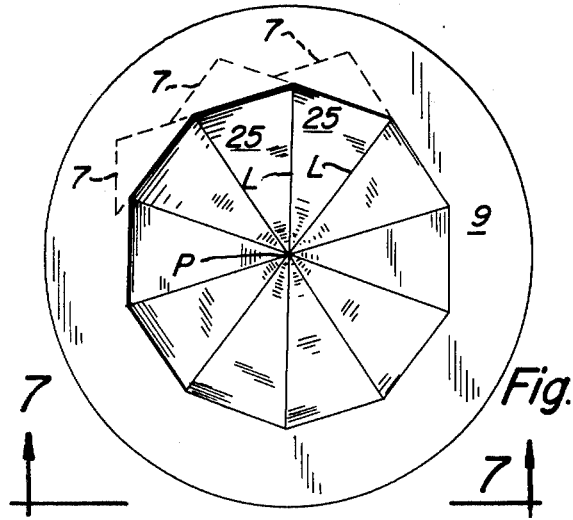
FIG. 4 is a view similar to FIG. 3 showing the valve assembly in a closed position.
Figure 5:
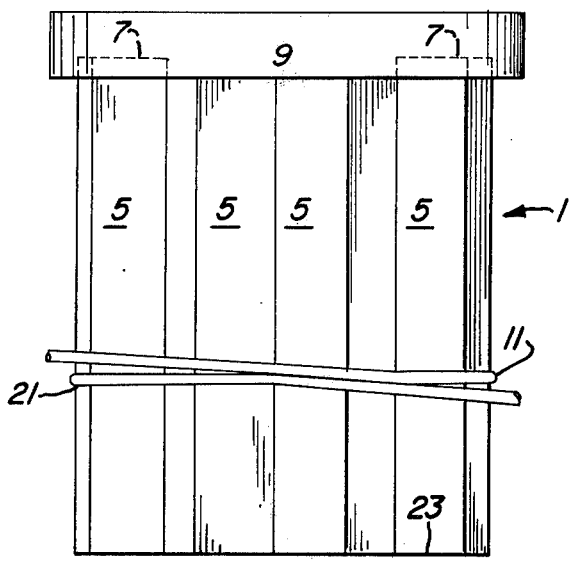
FIG. 5 is a view taken along line 5—5 of FIG. 2 showing the position of the valve members when the valve assembly is in an open position.
Figure 6:
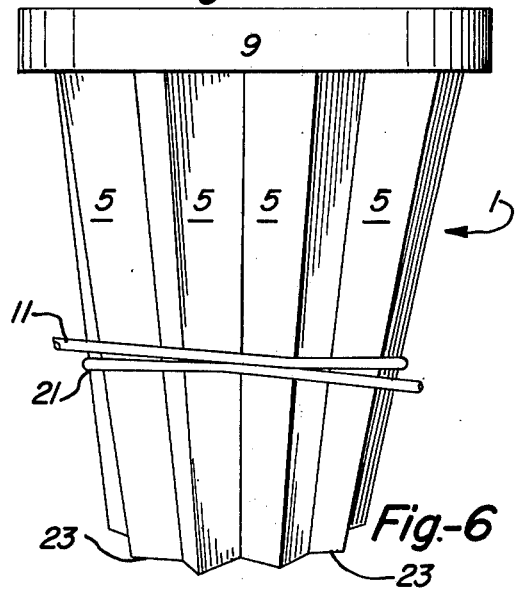
FIG. 6 is a view taken along line 6—6 of FIG. 4 showing the position of the valve members when the valve assembly is in a half-closed position.
Figure 7:
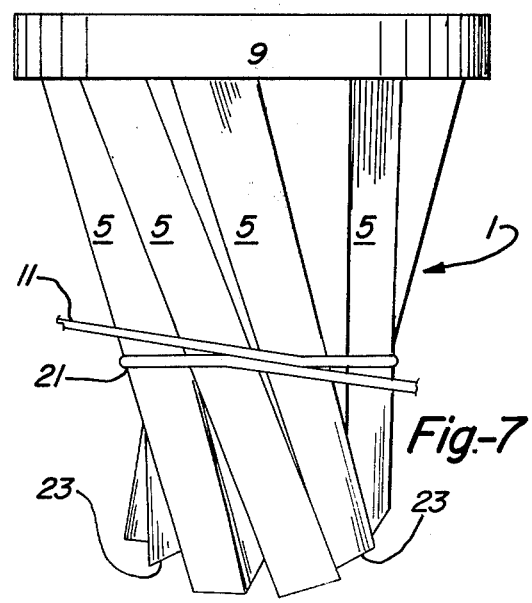
FIG. 7 is a view taken along line 7—7 of FIG. 5 showing the position of the valve members when the valve assembly is closed.

FIG. 1 shows the valve assembly 1 of the invention in use at the outlet of a cyclone 3. Generally, the material being conveyed is mixed with or suspended in a carrier fluid such as air, water, oil, and the like. The material and carrier fluid are pumped into or drawn into the cyclone 3 through the inlet 4 in the direction of arrow A. In the cyclone 3, the carrier fluid is substantially separated from the material and leaves the cyclone 3 near the top thereof as indicated by arrow B. The separated material or underflow passes out of the cyclone 3 through valve assembly 1. Often, the underflow is spiralling as indicated by arrow C. Referring to FIGS. 2-9, the valve assembly 1 has a plurality of elongated, prismatic valve members 5 mounted at one end portion 7 to the flexible, annular support means 9. The valve members 5 are supported by the support means 9 in an overlapping relationship. The closing of the valve assembly is controlled by the arrangement illustrated in FIG. 8 where one end of cable 11 is anchored to the cylindrical member 13 while the other end of cable 11 is anchored to the piston 15 of the cylinder 17 by coupling member 19. The cable 11 surrounds the valve members and, if desired, can be fitted into the notch 21 of each valve member 5 as shown in FIGS. 5-7 and 9. The notches 21 help to hold the cable 11 in a preferred position about the valve members 5; however, the notches 21 are not necessary to the operation of the closing mechanism. As the cable 11 is tightened about the valve members 5 by the moving of piston 15, the free standing second end portions 23 of the valve members 5 are moved toward each other to close the valve assembly 1. FIGS. 2-4 show the valve assembly 1 in its respective open, half open, and closed positions. FIG. 5 is a view along line 5-5 of FIG. 2 showing the position of the outside of the valve members 5 when the valve assembly 1 is open. FIG. 6 is a view along line 6—6 of FIG. 3 showing the position of the valve members 5 when the valve assembly 1 is in the half-closed position and FIG. 7 is a view along line 7—7 of FIG. 4 showing the position of the valve members 5 when the valve assembly 1 is closed.

Referring to FIGS. 2-7, FIGS. 2 and 5 show the valve assembly 1 in its fully open position. In this embodiment, the valve members 5 are disposed with the inwardly facing sides 25 substantially parallel with the longitudinal axis of symmetry of the valve assembly 1. As the valve assembly 1 is moved to its half-closed position in FIGS. 3 and 6, the leading edges L of each valve member pivot relative to the support means and slide along the inwardly facing side 25 of an adjacent valve member. The pivotal axes of the leading edges L are substantially coplanar as are the first end portions 7. In FIGS. 4 and 7, the valve assembly is in its closed position. The leading edges L of the valve members 5 converge at a point P on the axis of symmetry of the valve assembly 1 as illustrated in FIG. 4. FIGS. 2-4 are views looking along the axis of the valve assembly 1. As shown in FIG. 2-4, the valve assembly closes uniformly to a point P, each leading edge L as seen in FIGS. 2-4 being mounted to the support means 9 for pivotal movement along a path in a radial plane. Each radial plane includes the axis of the valve assembly 1 and the leading edges L move along their respective radial plane to converge at a point P on the axis.

Figure 10:
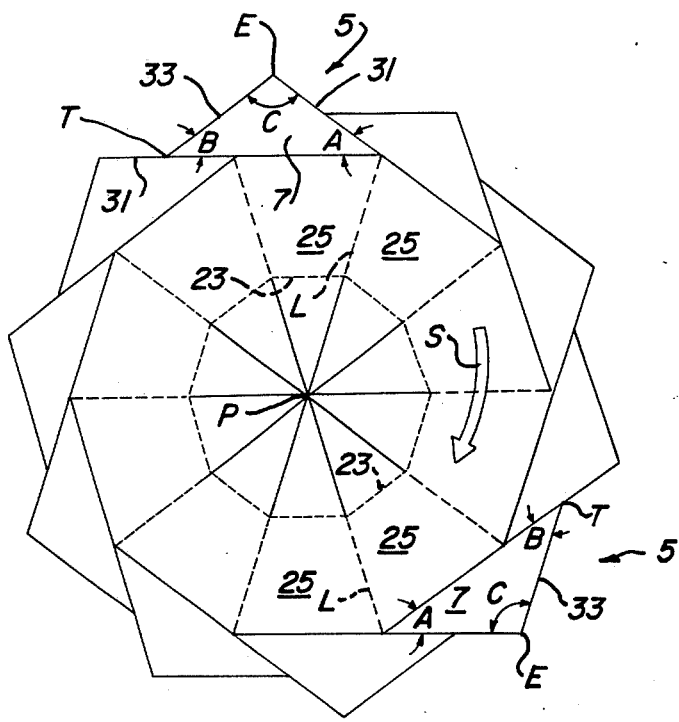
FIG. 10 is a view from the first end of a preferred arrangement of the valve members.

FIG. 10 illustrates the valve assembly 1 in a half-closed position (dotted lines) and in a closed position (full lines). The leading edge L of each valve member 5 pivots relative to the support means 9 about a substantially fixed axis and slides across the side 25 of an adjacent valve member as the valve assembly closes. The leading edges L eventually converge at a point P to close the valve assembly 1. Each leading edge L pivotally moves in a path along a radial plane that includes the axis of the valve assembly 1.

As best seen in FIG. 9, each valve member 5 in the preferred embodiment may have flanges 27 near the first end portion 7 embedded in the support means 9 which is a flexible elastomer. The elastomer 9 biases the valve member 5 in the overlapping position shown in FIG. 9. This is the open position of the valve assembly.

Figure 17:
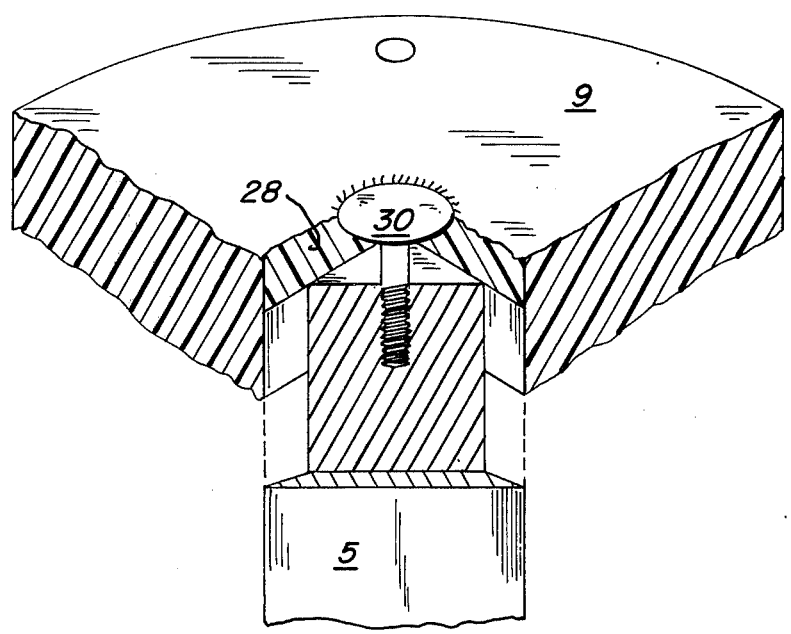
FIG. 17 illustrates another arrangement for movably attaching the valve members to the elastomer support. In this embodiment, the elastomer support has molded sockets into which the valve members are inserted and secured by bolts or other restraining devices.

An alternate manner of mounting the valve members 5 to the elastomer 9 is illustrated in FIG. 17. In this embodiment, the elastomer 9 has molded sockets 28 into which the valve members 5 are inserted and secured by a bolt 30 or other retaining means.

In the embodiments of FIGS. 10-13, each valve member 5 has a first end portion 7 and three substantially planar sides 25, 31, and 33 extending between the first end portion 7 and the second end portion 23. The first side 25 of each valve member 5 is joined to the second side 31 at an angle A to form a leading edge L. The first side 25 is also joined to the third side 33 at an angle B to form a trailing edge T. The second side 31 and the third side 33 are joined at an angle C to form a third edge E. The elastomer support means 9 biases the valve members 5 in a first overlapping position to encompass a space wherein the leading edge L and second side 31 of one valve member 5 are pressed against the first side 25 of another valve member 5 and the trailing edge T and first side 25 of the same one valve member are pressed against the second side 31 of a third valve member. The space encompassed by the overlapping valve members 5 is essentially an open-ended cylinder when the valve assembly is open. The valve members 5 can be set in the elastomer support means 9 to encompass an expanding or decreasing open-ended space as desired. As the valve assembly closes, the space encompassed by the overlapping valve members 5 becomes cone-like or substantially conical.

Figure 11:
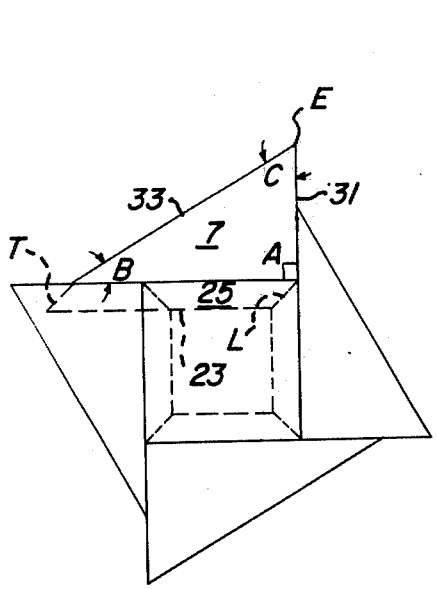
FIG. 11 shows a preferred valve assembly in which there are four valve members and the angles between the three sides of each valve member are 30°, 60° and 90° respectively.
Figure 12:
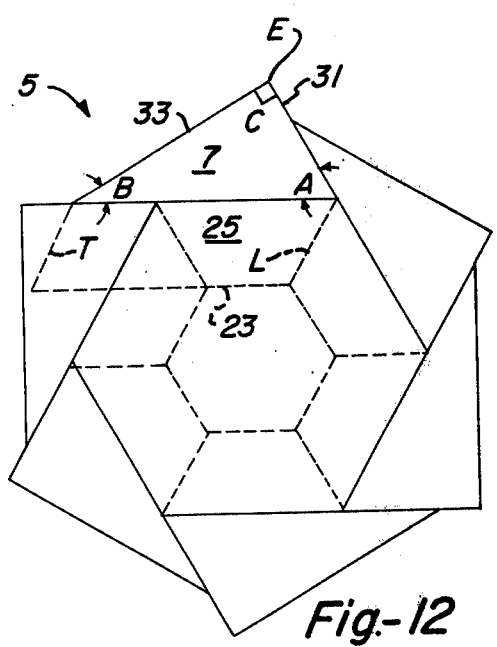
FIG. 12 illustrates another preferred embodiment in which there are six valve members and the angles between the three sides of each valve member are 30°, 60° and 90° respectively.
Figure 13:
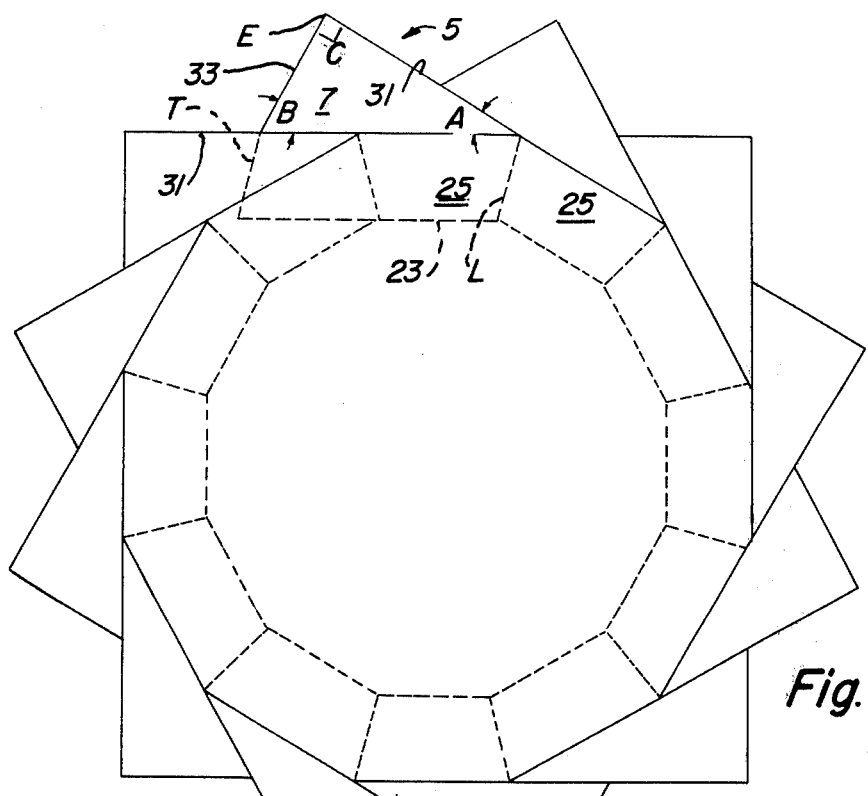
FIG. 13 illustrates another embodiment in which there are twelve valve members and the angles between the three sides of each valve member are 30°, 60° and 90° respectively.
Figure 14:
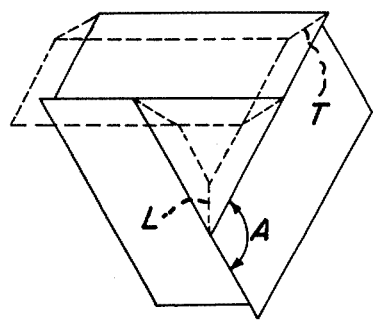
FIG. 14 illustrates an embodiment with three valve members in accordance with the invention.

In all of the embodiments, the Angle A of the leading edge L is preferably equal to about 360°/n where n is the number of valve members 5 in the particular valve assembly. The angle A can be slightly less than 360°/n. In the embodiment of FIG. 10, there are ten valve members 5 and both angles A and B are equal to 360°/n or 36°. In the embodiment of FIG. 11, there are four valve members 5 and the angle A is equal to 360°/n of 90°. The angles B and C in FIG. 11 are equal to 30° and 60° respectively. In FIG. 12, there are six valve members 5 and the angle A of the leading edge L is equal to 360°/n or 60°. Angles B and C in FIG. 12 are equal to 30° and 90° respectively. In the embodiment of FIG. 13, there are twelve valve members 5 and the angle A of the leading edge L is 360°/n or 30°. Angles B and C in FIG. 13 are equal to 30° and 90° respectively. In FIG. 14, there are three valve members 5 and angle A of the leading edge L is equal to 360°/n or 120°. In FIGS. 11-13, the shape of the valve member 5 is the same, only the number and position of the valve members 5 are varied. In the embodiments in which valve members 5 have three sides, the third edge E is preferably spaced from the first side 25 a distance equal to at least one-eighth the distance between the leading edge L and trailing edge T, and, the end portions 7 and 23 are preferably spaced a distance at least equal to the distance between the leading edge L and trailing edge T.

Figure 15:
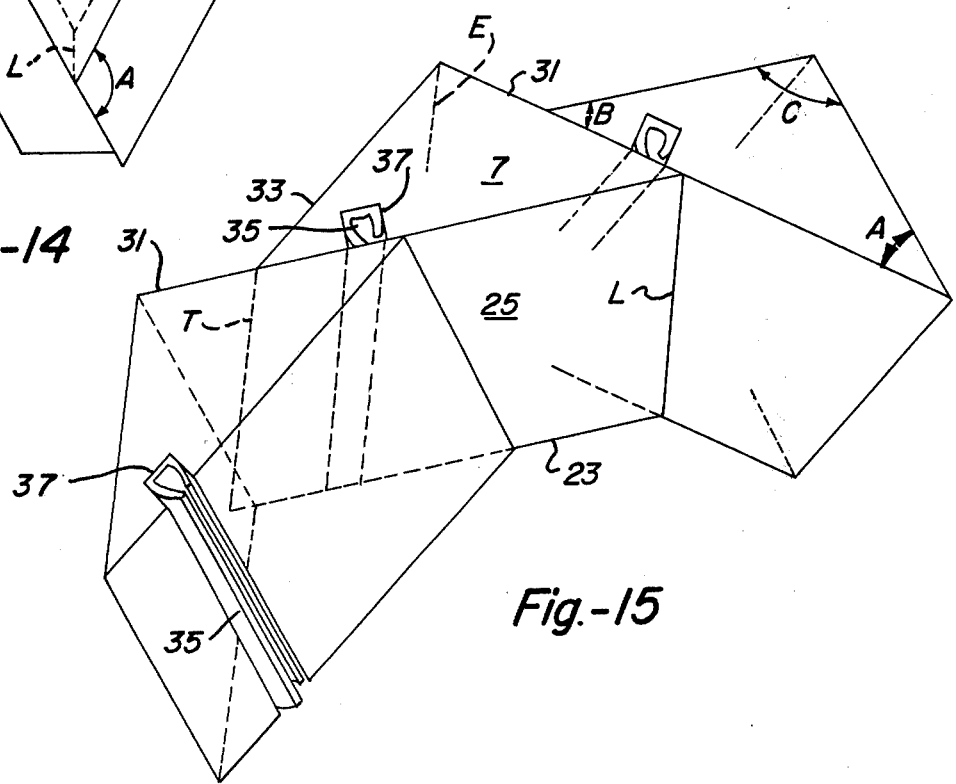
FIG. 15 shows an embodiment with a seal member extending along one side of each valve member.

FIG. 15 shows an embodiment in which a seal member 35 is positioned in an intended opening 37 in the first side 25 or the second side 31 of each valve member 5. Both the seal member 35 and its opening 37 extend substantially between the end portions 7 and 23 of each valve member 5. The seal member 35 is located between the leading edge L and trailing edge T of the side 25 (or second side 31) so that it always contacts side 31 (or side 25) of the adjacent valve member 5 and is never exposed to the flow of the material through the valve assembly 1.

FIG. 16 shows a valve member 5 that is tapered from the first end portion 7 to the second end portion 23. This tapering is useful when the valve assembly 1 must be fully closed, with the full open diameter of the assembly having a relatively large inner diameter, and enables the cable 11 to tightly close the valve assembly 1 without binding against the trailing edges T of the valve members 5. The direction of the tapering can alternately be from the second end portion 23 to the first end portion 7. In the preferred embodiment of FIG. 16, the leading edge L and the third edge E converge toward the trailing edge so that the triangles of the first end portion 7 and second end portion 23 are similar triangles.

Figure 19:
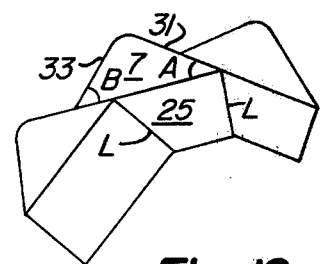
FIG. 19 shows valve members in which the second and third sides of each valve member are curved in the area where they meet.

FIG. 19 shows a valve member 5 in which the second and third sides (31 and 33) are curved in the area where they meet. The curved joining enables the closing mechanism to exert high pressure on the valve members 5 without having the force concentrated on a sharp edge which might cut the closing mechanism.

As illustrated in FIGS. 21-24, the valve members 5 and support means 9 can be made of one-piece construction forming a unitary member. In this embodiment, the one-piece valve assembly can be made of flexible or resilient material such as rubber, urethane, neoprene, silicones, and the like which can be pressure molded or flat poured and cured. As with the embodients in which the valve members 5 are distinct from the support means 9, each valve member of FIGS. 21-24 has a free standing end portion 23, leading edge L, trailing edge T, and substantially planar sides 25 and 31 meeting at an angle A to form edge L. The major difference in the embodiment of FIGS. 21-24 is that the valve members 5 and support means 9 are poured, molded, or otherwise made in a one-piece construction to form a unitary member so that the connection between the second end portion 7 of each valve member 5 and support means 9 is continuous. The operation of the valve assembly is otherwise identical to the other embodiments. The closing mechanism is preferably linearly actuated and is illustrated in FIGS. 21-24 as being a hose clamp 26. As molded or otherwise constructed, each valve member 5 extends substantially perpendicular to the support means 9. When clamp 26 is applied, the valve members 5 are swung inwardly toward the central axis with stressing of the resilient material in the region of connection between members 5 and the support means 9. In this manner, the valve members 5 are biased outwardly from the central axis and are urged into contact with each other. Referring to FIGS. 21-24 and as with all of the embodiments of the present invention, the leading edges L converged toward a common point as the valve assembly closes.

FIGS. 1 and 20 illustrate the new and novel relationship between the valve assembly 1 and the cyclone 3. The cyclone 3 can be a hydrocyclone and has a cylindrical portion 44 in FIG. 1 and a lower, tapering conical portion 46. As best seen in FIG. 20, the conical portion 46 has ceramic liners 48. The valve members 5 are mounted so they form a substantially conical continuation of the hydrocyclone's lower portion 46 as the valve assembly 1 closes (see the position illustrated in dotted lines in FIG. 20). The first sides 25 of the valve members 5 are substantially flush with the outlet of the hydrocyclone 3 to form a smooth transition for the material flowing from the lower portion 46 through the valve assembly 1. Member 50 in FIG. 20 is a splash guard.

In all of the embodiments, the angle A of the leading edge L formed by sides 31 and 25 are important features of each valve member. The angle B and the trailing edge T can be varied over a wide range. For example, the edge T could be undulating from one end portion to the other end portion of each valve member 5. The joining of sides 25 and 33 may even be rounded; however, a straight edge is preferred. As shown in FIG. 19, one embodiment has sides 31 and 33 which are curved in the area where they meet. All of the valve members 5 are illustrated as having at least three sides and forming solid figures, however, the valve members 5 could have only two sides joined to form a leading edge. The addition of a third side and the forming of a solid figure adds strength to the valve assembly 1 and allows for some wear to occur on the sides of the valve members 5 without destroying the sealing function of the valve members 5.

In operation, the valve assembly 1 is mounted in a duct such as a pipeline, outlet to a cyclone, nozzle, and the like with the support means 9 and first end portions 7 of the valve members 5 upstream of the second end portions 23 of the valve members 5. If the flow is spiralling in the direction of arrow S in FIG. 10, then the valve assembly 1 is mounted so that the flow strikes the first side 25 of each valve member 5 and moves toward the leading edge L thereof. As conditions vary in the duct and the flow needs to be throttled or stopped, the piston 15 is extended to tighten the cable 11 about the valve member 5 and move the second end portions 23 of the valve member 5 toward each other. Each leading edge L pivotally moves along a path in a radial plane. Each radial plane includes the axis of the valve assembly and the leading edges L thereof converge toward a point P near the second end portions 23 as seen in FIGS. 4 and 10. During the closing of the valve assembly 1, the leading edge L of one valve member 5 scrapes clean the area of side 25 of a second valve member 5 that is just ahead of where the second side 31 of that same one valve member 5 is about to contact the side 25 of the second valve member. This cleaning enhances the seal between the respective sides 25 and 31. As the valve assembly 1 uniformly closes to a point P, the biasing force of the elastomer support means 9 to return the valve members 5 to the open position of FIG. 9 is counter to the constricting force of the cable 11 and serves to press side 31 of one valve member 5 progressively tighter against side 25 of another valve member 5 as the valve assembly 1 closes. The valve assembly 1 can be completely closed or merely throttled sufficiently to cause the material to flow at a reduced rate. The size of the opening into the valve assembly 1 near the first end portions 7 remains substantially the same throughout the closing and opening operations of the valve assembly 1.

The valve assembly 1 may be placed in the duct at the inlet, middle, or outlet thereof. The duct may be under high ambient, or low pressure and the material flowing in the duct may be gas, liquid, particulare matter, slurries, or the like. The valve assembly 1 is strong, wear resistant, quick responding, long lasting and reliable. The valve assembly 1 can be used as a blow-back valve in which the material is flowing in the direction from the second end portions 23 toward the first end portions 7. The valve assembly 1 works particularly well with abrasive materials flowing in a spiral along the duct.

Figure 18:
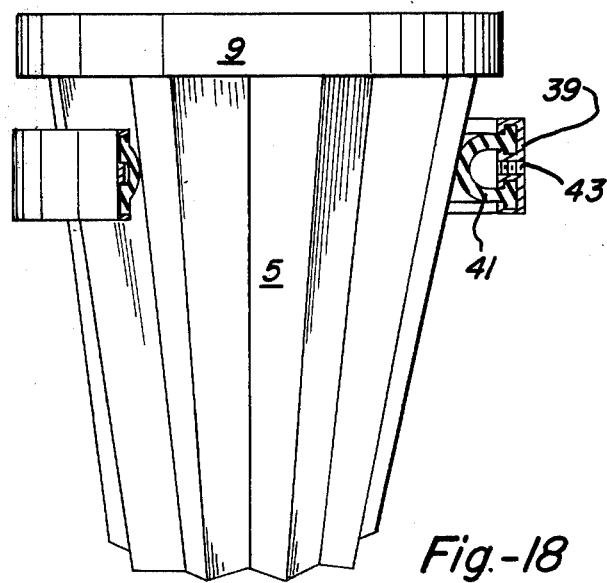
FIG. 18 illustrates an alternate closing mechanism for the valve assembly which includes an annular member and an inflatable member supported thereon. As the pressure of the fluid between the annular member and the inflatable member is increased, the inflatable member expands to move the valve members toward each other to close the valve assembly.

The valve members 5 of FIGS. 1-20 can be movably mounted within the elastomer support means 9 which can be constructed of flexible elastomers such as rubber, urethane, neoprene, silicones, and the like that are pressure molded or flat poured. The valve members 5 can also be movably mounted using mechanical means such as ball joints, cables, hinges, and the like. The closing mechanism is preferably linearly actuated and could be a hose clamp, exterior sleeve, rack and pinion arrangement, and the like. FIG. 18 illustrates an expandable sleeve-type closing mechanism having an annular member 39 to which an inflatable member 41 is attached. As fluid is added to the area between the members 39 and 41 through inlet 43, the inflatable member 41 expands inwardly to move the valve members 5 toward each other to close the valve assembly 1. The actuator for the cable arrangement of FIG. 8 could also be a threaded screw advance, pneumatic or hydraulic cylinder, electric drive, and the like. The valve members 5 are preferably made of hard materials such as silicon carbide, alumina oxide, white iron, metal alloys, glass, high durometer elastomers, ceramics and the like.

It is to be understood that embodiments other than the ones illustrated and described above may be made of the invention without departing from the scope thereof.

We claim:

1. A valve assembly for controlling the size of an opening in a duct such as a pipeline, outlet of a cyclone, and the like, said valve assembly comprising:
    at least three valve members, each valve member having first and second end portions spaced from each other and having at least first and second substantially planar sides extending substantially between said first and second end portions, said first and second sides of each valve member being joined at an angle to form a leading edge,
    means to support said at least three valve members in a first overlapping position with the first sides of said valve members encompassing a space, each valve member being supported with the leading edge thereof touching the first side of another valve member, said support means including means to mount the leading edge of each valve member near the first end portion thereof to said support means for substantially pivotal movement relative to said support means, and,
    means to move said valve members toward each other to control the size of the opening in said duct whereby the leading edges of each valve member pivot relative to said support means and converge near the second end portions of the valve members.

2. The valve assembly of claim 1 wherein said mounting means of said support means includes flexible material into which the first end portions of each valve member are embedded.

3. The valve assembly of claim 1 wherein said mounting means of said support means includes flexible material and means to attach the first end portions of each valve member to said flexible material.

4. The valve assembly of claim 1 wherein said mounting means of said support means includes means to bias said valve member in the first overlapping position, said first overlapping position of said valve assembly being as open position.

5. The valve assembly of claim 1 wherien:
    said support means supports said at least three valve members with the second side of each valve member touching the first side of another valve member, and, said mounting means of said support means includes means to bias said valve members in the first overlapping position so that when the valve members are moved toward each other to a second overlapping position by the moving means, the biasing of the valve members in the first position causes the second side of each valve member to press against the first side of another valve member whereby the leading edge of one valve member scrapes the first side of another valve member clean enabling the second side of said one valve member to form a tight seal with the first side of said other valve member, said biasing further causing said second side of one valve member to press progressively harder against the first side of another valve member as the second end positions are moved close toward each other.

6. The valve assembly of claim 1 wherein there are n number of valve members where n is at least three and said angle of the leading edge is equal to about 360°/n.

7. The valve assembly of claim 1 wherein each respective leading edge is moved about a pivotal axis, said pivotal axes being substantially coplanar.

8. The valve assembly of claim 1 wherein each valve member has at least a third side extending substantially between said first and second end portions and joined to said first side to form a trailing edge, said first and second end portions being spaced from each other a distance at least equal to the distance between the leading edge and trailing edge of the respective valve member as measured in the plane of the first side near the first end portion of the respective valve member.

9. The valve assembly of claim 8 wherein said leading edge and said trailing edge of each valve member converge toward each other.

10. The valve assembly of claim 1 wherein the distance between the first and second end portions of each valve member is approximately the same and said supporting means supports each of said first end portions in a substantially common plane.

11. The valve assembly of claim 1 wherein said means to move the valve members toward each other includes an elongated flexible member, said elongated flexible member being wrapped around said valve members and contacting each valve member, said means to move further including drive means secured to said elongated flexible member for moving said flexible member to constrict the area surrounded by the flexible member and move the valve members toward each other.

12. The valve assembly of claim 1 wherein said means to move the valve members toward each other includes an inflatable means surrounding said valve members and means to inflate said inflatable means to contact each valve member and move said valve members toward each other.

13. The valve assembly of claim 1 wherein at least one of said first and second sides of each valve member has an intended opening extending substantially between the first and second end portions thereof and each valve member further includes a seal member in each opening to contact a side of another valve member.

14. The valve assembly of claim 1 wherein each of said valve members has three sides extending substantially between the first and second end portions thereof with each side being joined to the other two sides, said second and third sides being substantially curved in the area where the second and third sides join.

15. The valve assembly of claim 1 wherein said supporting means supports each of said first end portions of said valve members in a substantially common plane.

16. The valve assembly of claim 1 wherein said supporting means supports each of said first end portions of said valve members and said second end portions thereof are free standing.

17. The valve assembly of claim 1 wherein said valve members and said support means are of one-piece construction forming a unitary member.

18. The valve assembly of claim 17 wherein said unitary member is made of flexible material.

19. The valve assembly of claim 18 wherein said flexible material is urethane.

20. A valve assembly for controlling the size of an opening in a duct such as a pipeline, outlet of a cyclone, and the like, said valve assembly comprising:
at least three valve members, each valve member having first and second end portions spaced from each other and having at least first and second substantially planar sides extending substantially between said first and second end portions, said first and second sides of each valve member being jointed at an angle to form a leading edge,
means to support said at least three valve members in a first overlapping position with said first sides of said valve members encompassing a space, each valve member being supported with the leading edge thereof touching the first side of another valve member along substantially the entire distance between the first and second end portions of said other valve members, said support means including means to mount the leading edge of each valve member near the first end portion thereof to said support means for substantially pivotal movement relative to said support means, and
means to move said valve members toward each other to control the size of the opening in said duct whereby the leading edges of each valve member pivot relative to said support means and converge near the second end portions of the valve members.

21. The valve assembly of claim 20 wherein said mounting means of said support means includes means to bias said valve member in the first overlapping position, said first overlapping position being an open position.

22. The valve assembly of claim 20 wherein:
said support means supports said at least three valve members with the second side of each valve member touching the first side of another valve member, and,
said mounting means of said support means includes means to bias said valve members in the first overlapping position so that when the valve members are moved toward each other to a second overlapping position by the moving means, the biasing of the valve members in the first position causes the second side of each valve member to press against the first side of another valve member whereby the leading edge of one valve member scrapes the first side of another valve member clean enabling the second side of said one valve member to form a tight seal with the first side of said other valve member, said biasing further causing said second side of one valve member to press progressively harder against the first side of another valve member as the second end portions are moved closer toward each other.

23. The valve assembly of claim 20 wherein there are n number of valve members where n is at least three and said angle of the leading edge is equal to about 360°/n.

24. The valve assembly of claim 20 wherein the leading edge of each respective valve member is moved about a pivotal axis, said axes being substantially coplanar.

25. The valve assembly of claim 20 wherein said mounting means of said support means mounts each respective leading edge for pivotal movement in a path along a radial plane extending from the axis of symmetry of said valve assembly to the position of each respective leading edge in the first overlapping position of the valve members.

26. The valve assembly of claim 20 wherein said valve members and said support means are of one-piece construction forming a unitary member.

27. The valve assembly of claim 26 wherein said unitary member is made of flexible material.

28. The valve assembly of claim 27 wherein said flexible material is urethane.

29. A valve assembly for controlling the size of an opening in a duct in which material is moving in a spiral along the duct, the valve assembly comprising:

at least three elongated valve members, each valve member having first and second end portions spaced from each other and having at least first and second elongated sides extending substantially between said first and second end portions, said first and second sides of each valve member being substantially planar sides joined at an angle to form a leading edge, means operably connected to said first end portions for supporting said valve members in an overlapping position with the first sides of said valve members encompassing a space, the leading edge of each valve member being supported to touch the first side of another valve member, said valve members being supported to receive said spiralling material along said first side of each respective valve member in a direction toward the leading edge thereof, and, means operably connected to said valve members for moving said second end portions of the valve members inwardly, said leading edges being convergent near the second end portions in response to said moving means.

30. The valve assembly of claim 29 wherein said support means includes means to mount the leading edge of each valve member to said support means for substantially pivotal movement relative to said support means.

31. The valve assembly of claim 29 wherein there are n number of valve members, where n is at least three and said angle of the leading edge is equal to about 360°/n.

32. The valve assembly of claim 29 including means to support said valve members with the first side of each valve member touching the second side of an adjacent valve member.

33. The valve assembly of claim 29 wherein said valve members and said support means are of one-piece construction forming a unitary member.

34. The valve assembly of claim 33 wherein said unitary member is made of flexible material.

35. The valve assembly of claim 34 wherein said flexible material is urethane.

36. An assembly comprising:

hydrocyclone means for separating material from a carrier fluid, said hydrocyclone means having an inlet and first and second outlets whereby material being conveyed in said carrier fluid enters said hydrocyclone means through said inlet and is substantially separated from said carrier fluid, said fluid exiting said hydrocyclone through said first outlet and said material exiting said hydrocyclone through said second outlet, and said hydrocyclone means further including a valve means for controlling the flow of said material through said second outlet, said valve means having (i) at least three valve members, each valve member having first and second end portions spaced from each other and having at least first and second substantially planar sides extending substantially between said first and second end portions, said first and second sides of each valve member being joined at an angle to form a leading edge, (ii) means to support said at least three valve members in a first overlapping position adjacent the periphery of said second outlet with said first sides of said valve members encompassing a space, each valve member being supported with the leading edge thereof touching the first side of another valve member, said support means including means to mount the leading edge of each valve member near the first end portion thereof to said means for substantially pivotal movement relative to said support means, and (iii) means to move said valve members toward each other to control the flow of material through said second outlet of said hydrocyclone means whereby the leading edges of each valve member pivot relative to said support means and converge near the second end portions of the valve members.

37. The assembly of claim 36 wherein:

said support means for said valve means supports each said valve members with the leading edge thereof touching the first side of another valve member along substantially the entire distance between the first and second end portions of said other valve member.

38. The assembly of claim 36 wherein:

said mounting means of said support means including means to bias said valve member in the first overlapping position, said first overlapping position being an open position.

39. The assembly of claim 36 wherein:

said support means of said valve means supports said at least three valve members with the second side of each valve member touching the first side of another valve member, and, said mounting means of said support means includes means to bias said valve members in the first overlapping position so that when the valve members are moved toward each other to a second overlapping position by the moving means, the biasing of the valve members in the first position causes the second side of each valve member to press against the first side of another valve member whereby the leading edge of one valve member scrapes the first side of another valve member clean enabling the second side of said one valve member to form a tight seal with the first side of said other valve member, said biasing further causing said second side of one valve member to press progressively harder against the first side of another valve member as the second end portions are moved closer toward each other.

40. The assembly of claim 36 wherein there are a n number of valve members of said valve means where n is at least three and said angle of the leading edge is equal to about $360°/n$.

41. The assembly of claim 36 wherein the leading edge of each respective valve member of said valve means is moved about a pivotal axis, said axes being substantially coplanar 42. The assembly of claim 36 wherein said mounting means of said support means mounts each respective leading edge for pivotal movement in a path along a radial plane extending from the axis of symmetry of said valve means to the position of each respective leading edge in the first overlapping position of the valve members.

43. The assembly of claim 36 means
said hydrocyclone means has an upper and lower portion, said lower portion being substantially conical and tapering toward said second outlet of the hydrocyclone means, and
said support means for said valve means supporting the first side of each valve member adjacent said first end portion of the valve member substantially flush with the lower, tapering conical portion of the hydrocyclone means at said second outlet whereby said first sides of the valve means form a substantially conical continuation of the lower, tapering conical portion of the hydrocyclone means as said valve members are moved toward each other.

44. The assembly of claim 36 wherein:
said material exiting through said second outlet of said hydrocyclone means is moving in a spiral path, and,
said support means for said valve means supports said valve members to receive said spiralling material along said first side of each respective valve in a direction toward the leading edge thereof.

45. The valve assembly of claim 36 wherein said valve members and said support means are of one-piece construction forming a unitary member.

46. The valve assembly of claim 45 wherein said unitary member is made of flexible material.

47. The valve assembly of claim 46 wherein said flexible material is urethane.

* * * * *